(12) United States Patent
Takeo

(10) Patent No.: US 9,148,539 B2
(45) Date of Patent: Sep. 29, 2015

(54) INFORMATION PROCESSING APPARATUS, INFORMATION PROCESSING METHOD, AND INFORMATION PROCESSING SYSTEM

(71) Applicant: CANON KABUSHIKI KAISHA, Tokyo (JP)

(72) Inventor: Akinori Takeo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/591,570

(22) Filed: Jan. 7, 2015

(65) Prior Publication Data

US 2015/0207949 A1     Jul. 23, 2015

(30) Foreign Application Priority Data

Jan. 22, 2014 (JP) .................................. 2014-009785
Dec. 10, 2014 (JP) .................................. 2014-250318

(51) Int. Cl.
    *G06F 15/00*     (2006.01)
    *G06F 3/12*      (2006.01)
    *G06K 1/00*      (2006.01)
    *H04N 1/00*      (2006.01)
    *G06F 21/31*     (2013.01)

(52) U.S. Cl.
    CPC ............ *H04N 1/00875* (2013.01); *G06F 21/31* (2013.01); *H04N 1/00204* (2013.01); *H04N 1/00856* (2013.01); *H04N 2201/0094* (2013.01)

(58) Field of Classification Search
    CPC .......... H04N 1/00875; H04N 1/00856; H04N 1/00204; G06F 21/31; G06K 15/02
    USPC ................................ 358/1.1, 1.13, 1.14, 1.15
    See application file for complete search history.

(56) References Cited

U.S. PATENT DOCUMENTS

| 8,503,008 B2 * | 8/2013 | Kubota ...................... 358/1.15 |
| 2013/0114101 A1 | 5/2013 | Takeo ........................ 358/1.14 |
| 2014/0215576 A1 * | 7/2014 | Sugiyama ...................... 726/4 |

FOREIGN PATENT DOCUMENTS

JP          2011-4087 A       1/2011

* cited by examiner

*Primary Examiner* — Douglas Tran
(74) *Attorney, Agent, or Firm* — Fitzpatrick, Cella, Harper & Scinto

(57) ABSTRACT

It is determined that the multi-function peripheral operates according to a first mode in which user authentication is available and department authentication is not available or operates according to a second mode in which both of the user authentication and department authentication are available. In a case that the multi-function peripheral operates according to the first mode, user authentication information is transmitted to the multi-function peripheral. In a case that the multi-function peripheral operates according to the second mode, authentication information is transmitted to the multi-function peripheral. The authentication information is used to causing the multi-function peripheral to perform selection authentication before performing a job. The selection authentication is one selected from the user authentication and department authentication by a user.

8 Claims, 8 Drawing Sheets

F I G. 7

| SETTING NAME | MFP 101 SETTING | | DRIVER SOFTWARE AUTHENTICATION MODE DESIGNATION | |
|---|---|---|---|---|
| | REMOTE JOB FOR WHICH USER AUTHENTICATION IS NOT PERFORMED RESTRICTED | AUTHENTICATION BY DEPARTMENT ID AND PASSWORD PROHIBITION | USER AUTHENTICATION | DEPARTMENT AUTHENTICATION |
| SETTING VALUE | ENABLED | — | RECEPTION POSSIBLE | RECEPTION NOT POSSIBLE |
| | DISABLED | DISABLED | RECEPTION POSSIBLE | RECEPTION POSSIBLE |
| | | ENABLED | RECEPTION POSSIBLE | RECEPTION NOT POSSIBLE |

F I G. 8
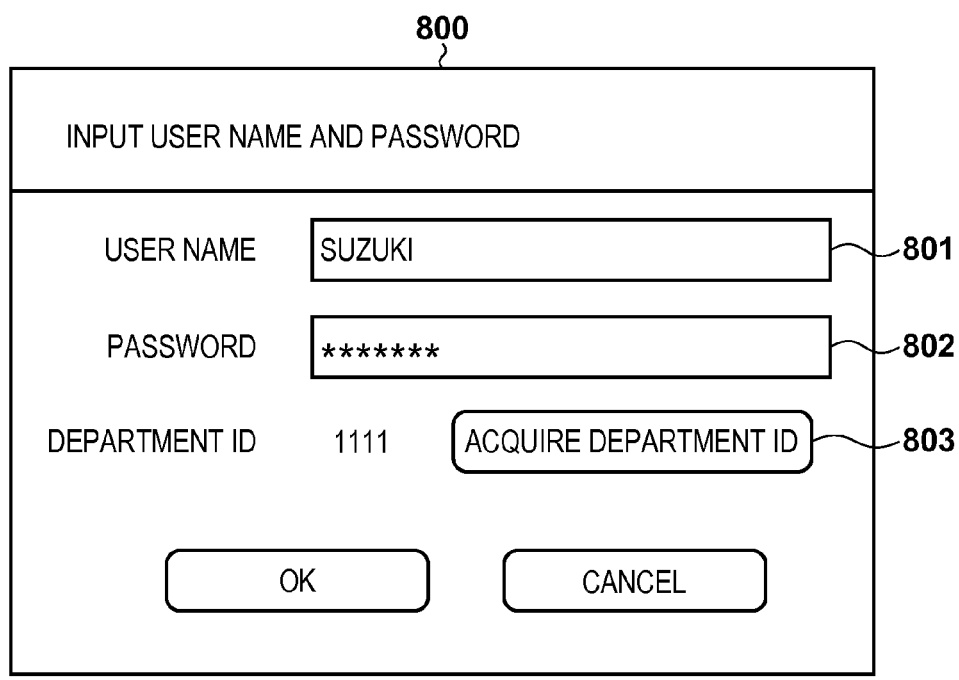

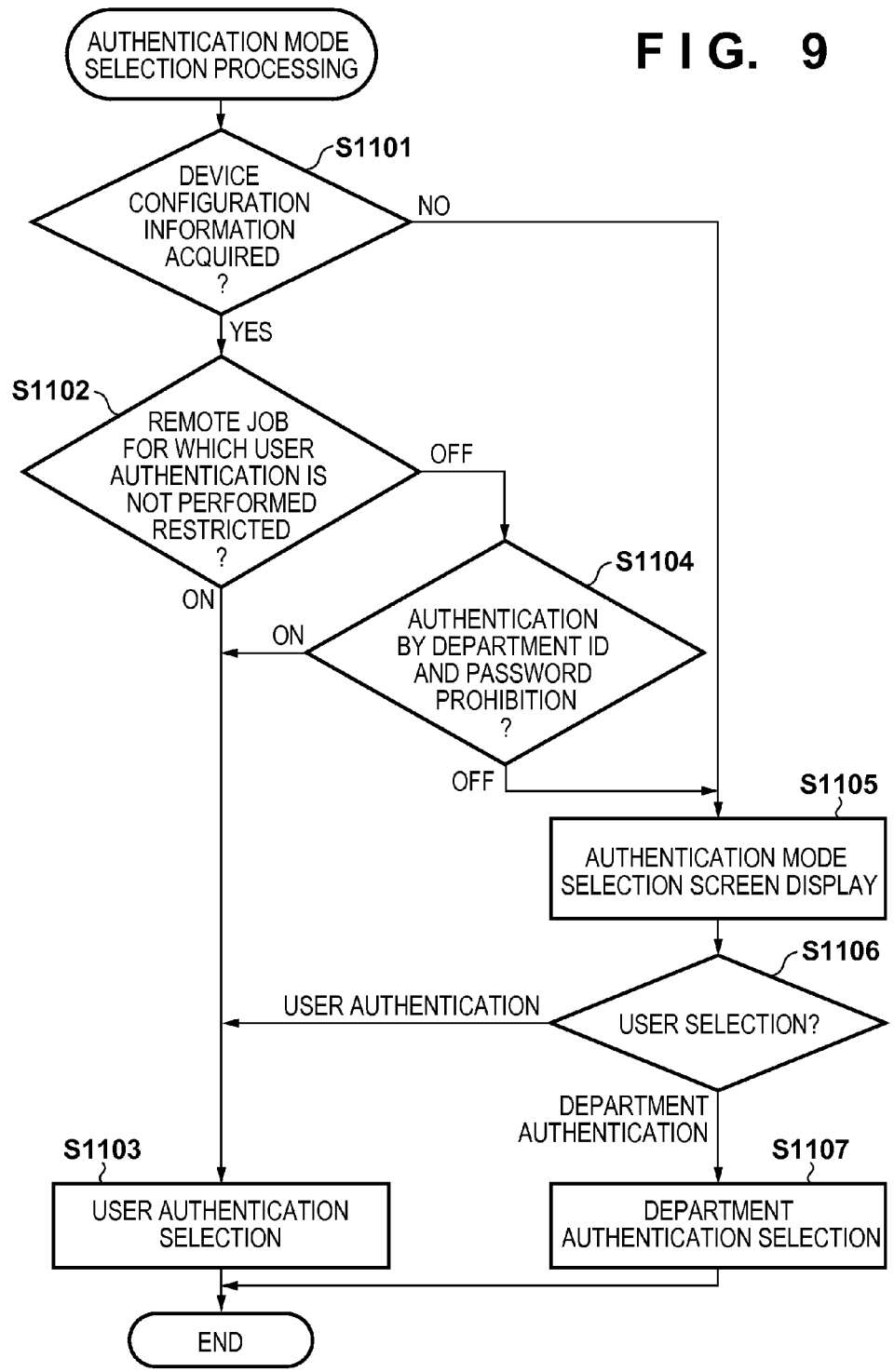

INFORMATION PROCESSING APPARATUS, INFORMATION PROCESSING METHOD, AND INFORMATION PROCESSING SYSTEM

BACKGROUND OF THE INVENTION

1. Field of the Invention

The present invention relates to a technique for causing a multi-function peripheral to execute a job.

2. Description of the Related Art

Conventionally, office environments have existed in which a department authentication (department management) is used for budget management for each group or department, when using an image forming apparatus. However, because of a rise in security consciousness in recent years, environments in which, in place of department authentication, user authentication is used are increasing. Furthermore, there have come to be many office environments that permit the execution of a job for copying or scanning in cases where user authentication is used.

Also, an authentication operation is performed by allowing a user to input authentication information (for example, a user name and a password) using a user interface such as a touch panel of an image forming apparatus, and verifying against a pre-registered user information database.

In user authentication using a user interface of the image forming apparatus, it is possible to first display an authentication screen, and then to only allow execution of jobs after the user authentication has been executed by performing screen control such that various function screens are only displayed after having completed the user authentication.

For this reason, systems exist in which, for a print job transmitted from an external device, the print job is temporarily saved by the image forming apparatus in order to allow the user authentication to be executed, and after execution of the user authentication by a user interface of the image forming apparatus, print job processing is initiated. Also, it is possible to use both user authentication and department authentication (Japanese Patent Laid-Open No. 2011-4087).

Meanwhile, in a case where a job, such as a print job, a remote scan job, or a fax transmission job, is caused to execute by the job being transmitted from an external device, such as a personal computer connected to the image forming apparatus via a network by driver software, the department authentication is mainly used, and for a portion of driver software, the user authentication is used.

However, in the conventional techniques, there is the following problem. Because the department authentication is performed by a verification of a numeral department ID and a password for each department, the total number of combinations is small compared to the user authentication, and so security strength is low. On the other hand, conventional driver software which does not support the user authentication can only use the department authentication. For this reason, image forming apparatuses make the department authentication useable for execution jobs transmitted from external devices even if the authentication mode set for the image forming apparatus is the user authentication in order to preserve compatibility with conventional driver software and allow jobs to be executable. For this reason, there is a problem in that a job execution path by which the user authentication is not performed remains. Also, from a security perspective, it is an undesirable situation where the same authentication mode as the authentication mode executed by a user interface of the image forming apparatus for an execution job from an external device cannot be applied.

SUMMARY OF THE INVENTION

The present invention was conceived in view of these kinds of problems, and provides a technique for making a user authentication applicable for an execution of a job inputted into a multi-function peripheral from an external device, and making an authentication mode selectable in accordance with an operation policy in a user environment where only the user authentication is useable while preserving compatibility with conventional driver software as much as possible. Also, the authentication mode is caused to match for the above described external device and the multi-function peripheral.

According to the first aspect of the present invention, there is provided an information processing apparatus capable of network communication with a multi-function peripheral, the apparatus comprising: a determination unit configured to determine that the multi-function peripheral operates according to a first mode in which user authentication is available and department authentication is not available or operates according to a second mode in which both of the user authentication and department authentication are available; and a transmission unit configured to transmit, in a case that the determination unit determines that the multi-function peripheral operates according to the first mode, user authentication information to the multi-function peripheral, the user authentication information being used to causing the multi-function peripheral to perform the user authentication before performing a job, and transmit, in a case that the determination unit determines that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

According to the second aspect of the present invention, there is provided an information processing system having a multi-function peripheral and an information processing apparatus capable of network communication with the multi-function peripheral, the multi-function peripheral operates according to a first mode in which user authentication is available and department authentication is not available or operates according to a second mode in which both of the user authentication and department authentication are available, the information processing apparatus comprising: a determination unit configured to determine that the multi-function peripheral operates according to the first mode or operates according to the second mode; and a transmission unit configured to transmit, in a case that the determination unit determines that the multi-function peripheral operates according to the first mode, user authentication information to the multi-function peripheral, the user authentication information being used to causing the multi-function peripheral to perform the user authentication before performing a job, and transmit, in a case that the determination unit determines that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

According to the third aspect of the present invention, there is provided an information processing method performed by an information processing apparatus capable of network communication with a multi-function peripheral, the method comprising: a determination step of determining that the multi-function peripheral operates according to a first mode in which user authentication is available and department authentication is not available or operates according to a second mode in which both of the user authentication and department authentication are available; and a transmission step of transmitting, in a case that it is determined in the determination step that the multi-function peripheral operates according to the first mode, user authentication information to the multi-function peripheral, the user authentication information being used to causing the multi-function peripheral to perform the user authentication before performing a job, and transmitting, in a case that it is determined in the determination step that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

Further features of the present invention will become apparent from the following description of exemplary embodiments (with reference to the attached drawings).

BRIEF DESCRIPTION OF THE DRAWINGS

FIG. 7 is a view for showing an example of control of whether or not to perform execution of a job by the MFP 101.

FIG. 8 is a view for illustrating an example configuration of a GUI 800.

FIG. 9 is a flowchart for processing that the PC 102 performs.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

Figure 1:
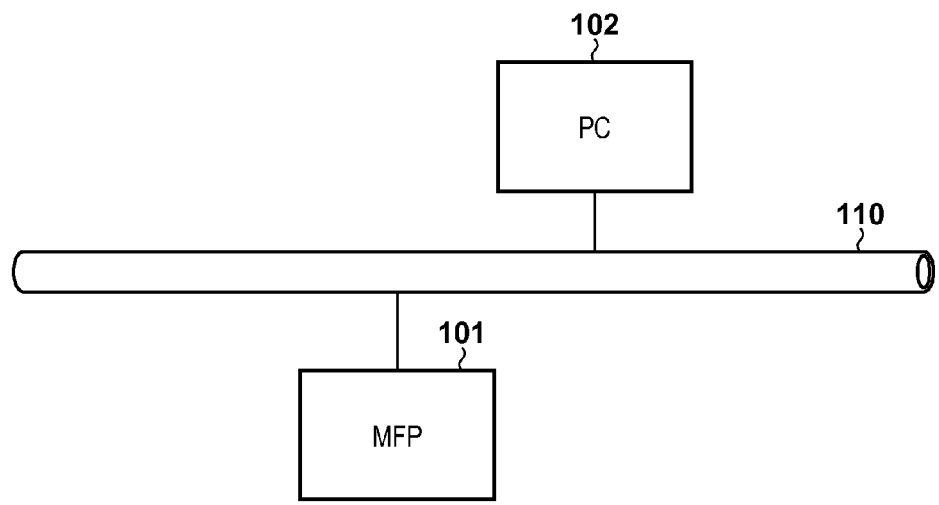
FIG. 1 is a view for illustrating an example configuration of an information processing system.

Firstly, for an example configuration of an information processing system according to embodiments, explanation will be given using FIG. 1. As shown in FIG. 1, the information processing system according to the embodiment, has a PC (personal computer) 102 that functions as an information processing apparatus, and an MFP (Multi Function Peripheral) 101 which is a multi-function peripheral having a printer and a scanner. The PC 102 and the MFP 101 are connected via a network 110, and can perform data communication with each other. The network 110 may be a wired connection and may be wireless.

Figure 2:
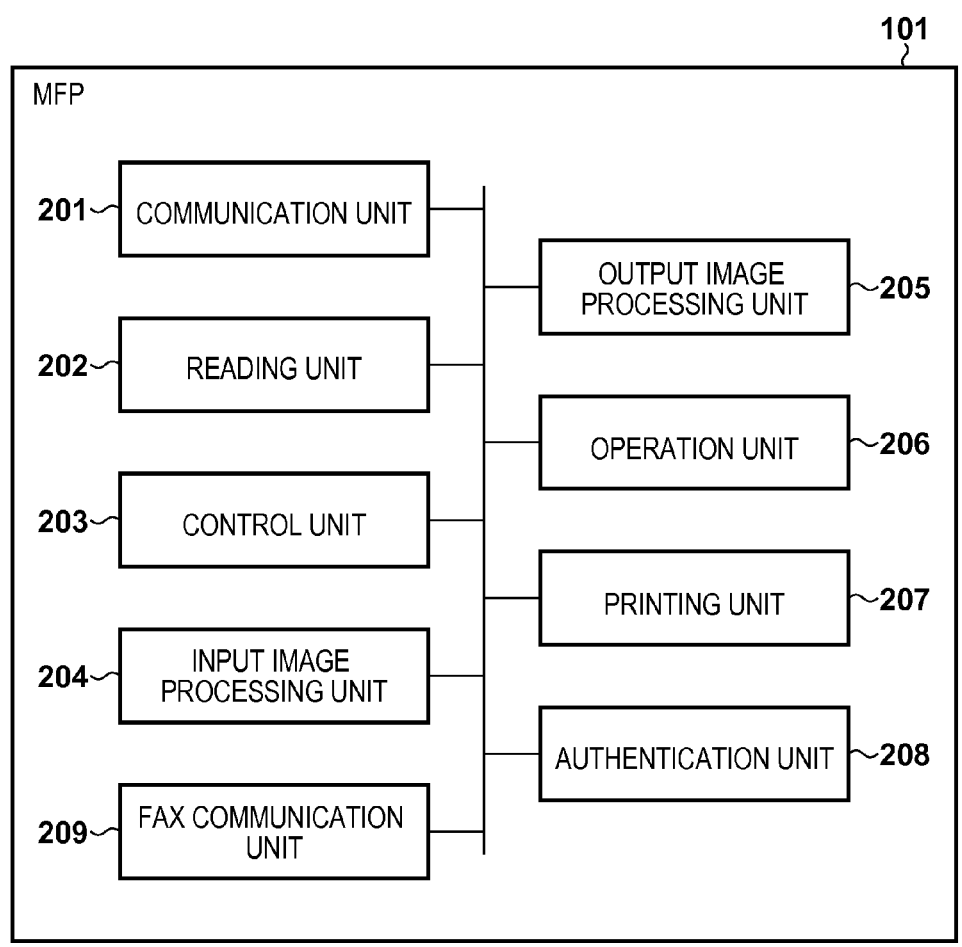
FIG. 2 is a block diagram for showing an example configuration of an MFP 101.

Next, for an example configuration of the MFP 101, explanation will be given using a block diagram of FIG. 2.

A communication unit 201 is comprised of a known communication interface, and performs data communication with the PC 102 via the above described network 110. For example, the communication unit 201 receives a print job including a print command and print data, a scan job including scan parameters, a fax transmission job including fax transmission destination information, or the like, from the PC 102.

A reading unit 202 reads information printed on a recording medium such as a sheet, and outputs a result of the reading as an image.

A control unit 203 has a configuration for storing computer programs and data including a CPU, a RAM, a ROM, an HDD (hard disk drive), or the like (not shown), and a configuration for executing processing using the computer programs and the data. For example, by the CPU loading the computer programs and data stored in the ROM or the HDD into the RAM and executing, control of operation for each functional unit that comprises in the MFP 101 is performed, processing explained later that the MFP 101 performs is realized.

An input image processing unit 204 applies various image processing (for example, shading correction processing, MTF correction processing, or the like) to an image output as a result of reading from the reading unit 202, and outputs the image to which the image processing is applied.

An output image processing unit 205 applies various image processing to an image to which the image processing is applied by the input image processing unit 204, and to print data in a print job that the communication unit 201 received from the PC 102. The image processing by the output image processing unit 205 may be, for example, rasterization processing, monochrome processing, monocolor processing, additional image composition processing, halftoning processing, or the like.

An operation unit 206 has a functional unit for displaying a result of processing by the control unit 203 as an image, text, or the like, and a functional unit for a user to operate in order to input various operation instructions, such as a touch panel screen, hard keys or the like.

A printing unit 207 performs printing on a recording medium such as a sheet based on a print job, and may use an ink and may use a toner. In other words, in this embodiment, the printing unit 207 may have any configuration in which it is able to perform printing on a recording medium such as a sheet.

The authentication unit 208 executes whichever of a user authentication, which is an authentication using information specific to a user, and a group authentication which is an authentication using information specific to a group (hereinafter referred to as a "department") to which the user belongs (for example, a department ID and password), is selected by later explained processing.

A FAX communication unit 209, through a telephone line, or the like, performs a FAX communication and performs transmission and reception of a FAX document with a communication partner apparatus.

Figure 3:
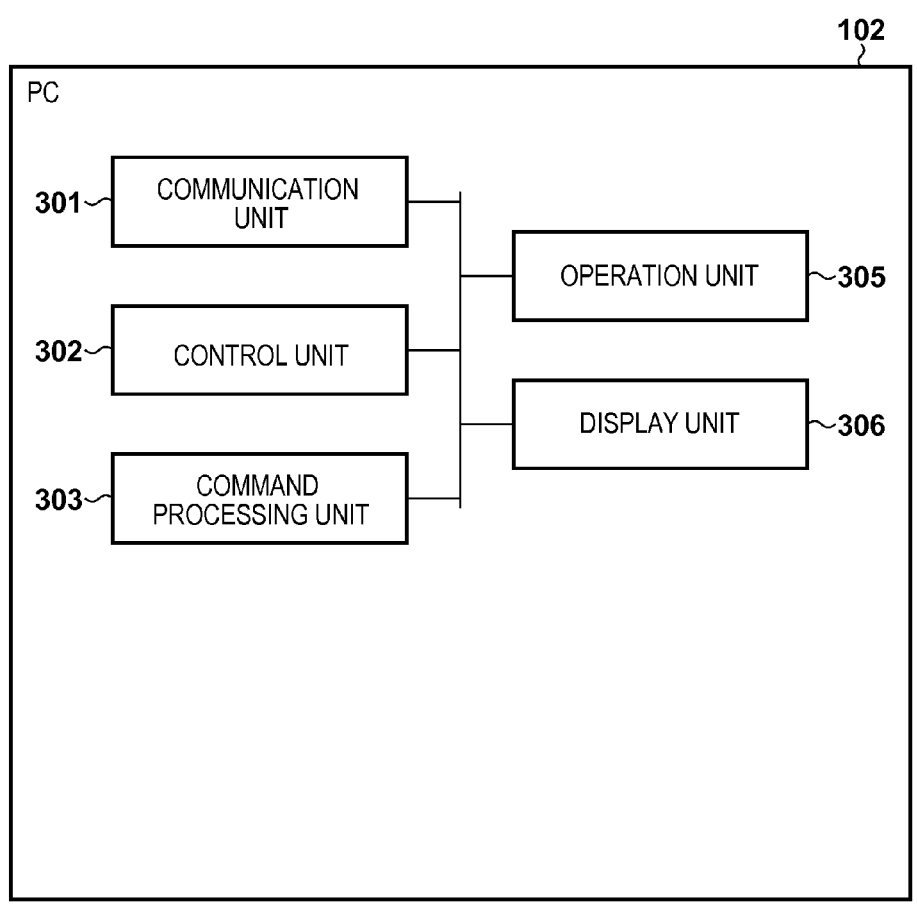
FIG. 3 is a block diagram for showing an example configuration of a PC 102.

Next, for an example configuration of the PC 102, explanation will be given using the block diagram of FIG. 3.

A communication unit 301 is comprised of a known communication interface, and performs data communication with the MFP 101 via the above described network 110. For example, the communication unit 301 transmits a print job including a print command and print data, a scan job including scan parameters, a fax transmission job including fax transmission destination information, or the like, to the MFP 101.

A control unit 302 has a configuration for storing computer programs and data including a CPU, a RAM, a ROM, an HDD (hard disk drive), or the like (not shown), and a configuration for executing processing using the computer programs and the data. For example, by the CPU loading the computer programs and data stored in the ROM or the HDD into the RAM and executing, control of operation for each functional unit that comprises in the PC 102 is performed, and processing explained later that the PC 102 performs is realized. In such computer programs, driver software of the MFP 101 is included.

A command processing unit 303 generates commands for causing the MFP 101 to execute print jobs, scan jobs, or fax transmission jobs, and the communication unit 301 interprets the commands received from the MFP 101.

An operation unit 305 is comprised of a mouse, a keyboard, or the like, and a user of the PC 102 is able to input into the control unit 302 various instructions by operating the operation unit 305. A display unit 306 is comprised of a CRT, a liquid crystal screen, or the like, and is able to display an image, text, or the like, as a result of processing by the control unit 302.

Next, explanation will be given for processing that the PC 102 performs in order to transmit various jobs such as those described above to the MFP 101 using FIG. 9 which shows a flowchart for this processing. Processing in accordance with the flowchart of FIG. 9 is processing performed by the control unit 302 executing driver software of the above described MFP 101.

Here, prior to performing the processing in accordance with the flowchart of FIG. 9, setting such as that described below is performed in advance using GUIs (Graphical User Interfaces) shown in FIGS. 5 and 6 on the side of the MFP 101.

setting of whether or not a user authentication is required in order to execute a job transmitted from the PC 102 (a first setting)

setting of whether or not a group authentication is required in order to execute a job transmitted from the PC 102 (a second setting)

Figure 5:
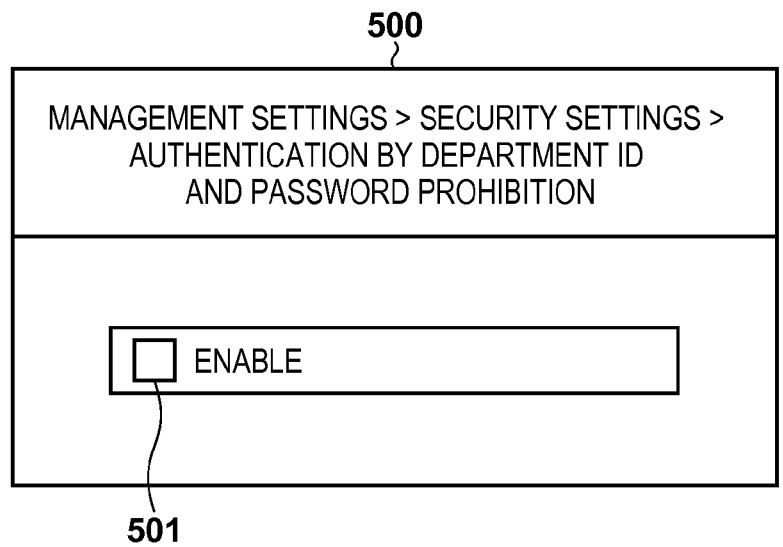
FIG. 5 is a view for illustrating an example configuration of a GUI 500.

The GUI 500 shown in FIG. 5 is a GUI for performing the second setting, and when a user inputs an instruction for performing the second setting by operating the operation unit 206, the control unit 203 displays the GUI 500 exemplified in FIG. 5 on the operation unit 206 (touch panel screen).

When the user sets a check-box 501 on the GUI 500 to a checked state (enables) by operating the operation unit 206, the control unit 203 sets so that the group authentication is prohibited. On the other hand, when the user sets the check-box 501 on the GUI 500 to be unchecked (disables) by operating the operation unit 206, the control unit 203 sets so that the group authentication is permitted.

In an initial setting, even in a case where the authentication mode is set to the user authentication in the MFP 101, compatibility with the driver software operating on the PC 102 is considered to be important, and the check-box 501 is not checked, permitting the group authentication. In general, the department authentication, which is a group authentication, is an authentication by a department ID and password, and compared to a user authentication by a user name and a password including English text and numerals, for example, a security strength relating to the authentication is lower. For this reason, checking the check-box 501 in order to make the security strength of the authentication higher may be performed.

Note, an activation of the GUI 500 and an operation input with respect to the GUI 500 are assumed to be possible only in a case of an administrator authority of the MFP 101. Also, it is assumed that the PC 102 is able to obtain a result of setting using the GUI 500 via the network 110.

Figure 6:
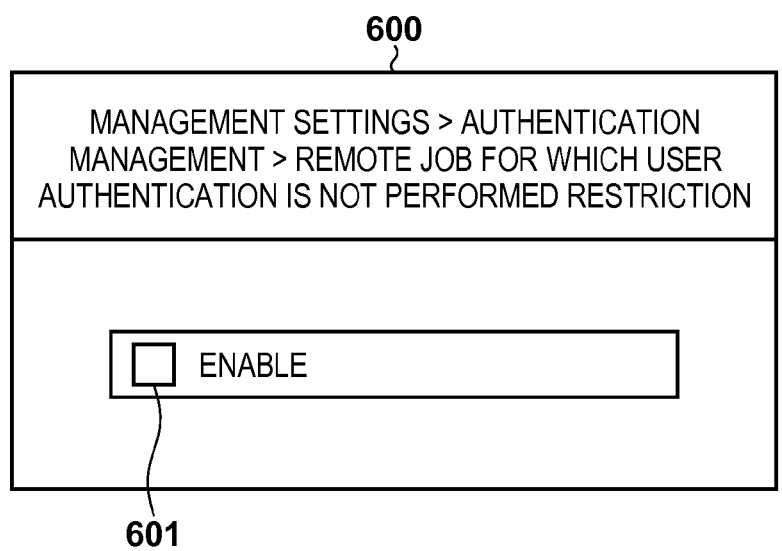
FIG. 6 is a view for illustrating an example configuration of a GUI 600.

The GUI 600 shown in FIG. 6 is a GUI for performing the first setting, and when a user inputs an instruction for performing the first setting by operating the operation unit 206, the control unit 203 displays the GUI 600 exemplified in FIG. 6 on the operation unit 206 (touch panel screen).

When the user sets a check-box 601 on the GUI 600 to a checked state (enables) by operating the operation unit 206, the control unit 203 sets that "the user authentication is required in order to execute a job received from the PC 102". Meanwhile, when the user sets the check-box 601 on the GUI 600 to an unchecked state (disables) by operating the operation unit 206, the control unit 203 sets that "the user authentication is not required in order to execute a job received from the PC 102". If, in a state where the check-box 601 is enabled, a job for which the user authentication cannot be performed is received from the PC 102, the control unit 203 treats the job processing as an error, and records an error history.

Note, an activation of the GUI 600 and an operation input with respect to the GUI 600 are assumed to be possible only in a case of an administrator authority in the MFP 101. Also, it is assumed that the PC 102 is able to obtain a result of setting using the GUI 600 via the network 110.

In step S1101, the control unit 302 determines whether or not the contents set using the GUIs 500 and 600 on the side of the MFP 101 (the device configuration information) are already acquired from the MFP 101. In a case where the result of the determination is that the contents are already acquired, the processing proceeds to step S1102, and in a case where the contents are not acquired the processing proceeds to step S1105.

Note, the device configuration information is not limited to contents set using both the GUIs 500 and 600, and may indicate whether or not contents set on either of the GUIs 500 and 600 is enabled (that a check-box is enabled). Also, configuration may be taken so that other information is included in the device configuration information, and information such as a paper feed tray configuration, an option configuration, or the like, and a setting value pertaining to an authentication mode, an authentication algorithm, or the like, may be included.

In step S1102, the control unit 302, referencing the device configuration information, determines whether or not the first setting is enabled (it is set that the user authentication is required in order to execute a job received from the PC 102). If the result of this determination is that the first setting is enabled, the processing proceeds to step S1103, and if the first setting is not enabled, the processing proceeds to step S1104.

In step S1103, the control unit 302 selects the user authentication as the authentication mode to perform the authentication prior to the execution of the job on the side of the MFP 101, and a GUI 800, exemplified in FIG. 8, is displayed on the display unit 306. The GUI 800 is a GUI for setting a user name and a password used in the user authentication.

A region 801 is a region for inputting the user name, and the user is able to input a desired user name into the region 801 by operating the operation unit 305. A region 802 is a region for inputting the password, and the user is able to input a desired password into the region 802 by operating the operation unit 305.

Also, by the user making an instruction on a button 803 by operating the operation unit 305, the control unit 302 acquires an ID (a department ID) of a department corresponding to the user name (a department that the user belongs to) from the MFP 101 and displays it on the GUI 800. In FIG. 8, the department ID acquired and displayed is "1111".

Then, when the user makes an instruction on an "OK" button after inputting the user name and the password on the GUI 800 by operating the operation unit 305, the control unit 302 controls the command processing unit 303, and a command {authentication mode=user authentication, user name=user name inputted into region 801, password=password inputted into region 802} is generated. Then, the control unit 302 transmits this command to the MFP 101 by controlling the communication unit 301, and causes a request for execution of a job accompanying user authentication processing to be performed.

Note, there are two types of execution timings for authentication processing in which there is exchange between the PC 102 and the MFP 101. One is where the MFP 101 performs the authentication processing upon reception of the job. The other is when prior to the execution of the job, the authentication processing is performed. Because, in the case of the latter, the result of the authentication is obtained prior to the execution of the inputting of the job, it is possible to avoid inputting of a job in which there is an authentication failure. However, because in such a case there is a presupposition that the result of the authentication, corresponding to an authentication command, is notified of by the MFP 101, this cannot be used in an environment in which communication from the MFP 101 to the PC 102 is difficult.

However, the configuration of the command that is transmitted may be changed as appropriate according to the circumstances. Also, configuration may also be taken such that the command is transmitted to the MFP 101 after having encoded or encrypted a portion or the whole of the command.

Also, the setting of the user name and the password using the GUI 800 is not limited to being performed at this point in time, and may be performed immediately before the transmission of the job, and configuration may also be taken such that it is performed in advance before initiation of the processing in accordance with the flowchart of FIG. 9. Note, for the user name inputted into the region 801 of the GUI 800, a department counter to which the department ID is associated is incremented by job processing in the MFP 101.

Meanwhile, in step S1104, the control unit 302, referencing the device configuration information, determines whether or not the second setting is enabled (prohibiting the group authentication). If the result of this determination is that the second setting is enabled, the processing proceeds to step S1103, and if the setting is not enabled, the processing proceeds to step S1105.

In step S1105, the control unit 302 causes a GUI (not shown) for allowing selection of either the user authentication or the group authentication to display on the display unit 306, and a selection instruction from the user is awaited. Then, in a case where the user selects the user authentication by operating the operation unit 305, the processing proceeds to step S1103 through step S1106, and in a case where the group authentication is selected, the processing proceeds to step S1107 through step S1106.

In step S1107, the control unit 302 selects the group authentication as the authentication mode for performing the authentication prior to the execution of the job on the side of the MFP 101, and causes a GUI (not shown) for setting the authentication information using the group authentication to display (GUI for authentication information input) on the display unit 306. Then, when the user makes an instruction on an "OK" button after inputting the authentication information on the GUI for authentication information input by operating the operation unit 305, the control unit 302 controls the command processing unit 303, and a command {authentication mode=group authentication, authentication information=authentication information inputted by the GUI for authentication information input} is generated. Then, the control unit 302 transmits this command to the MFP 101 by controlling the communication unit 301, and causes a request for execution of a job accompanying group authentication to be performed.

Also, the setting of the authentication information using the GUI for authentication information input is not limited to being performed at this point in time, and may be performed immediately before the transmission of the job, and configuration may also be taken such that it is performed in advance before initiation of the processing in accordance with the flowchart of FIG. 9. Note that, steps S1105 and S1106 can be omitted from the flowchart shown in FIG. 9. In this case, if the result of the determination in step S1104 is that the second setting is not enabled, the processing proceeds to step S1107.

Figure 4:
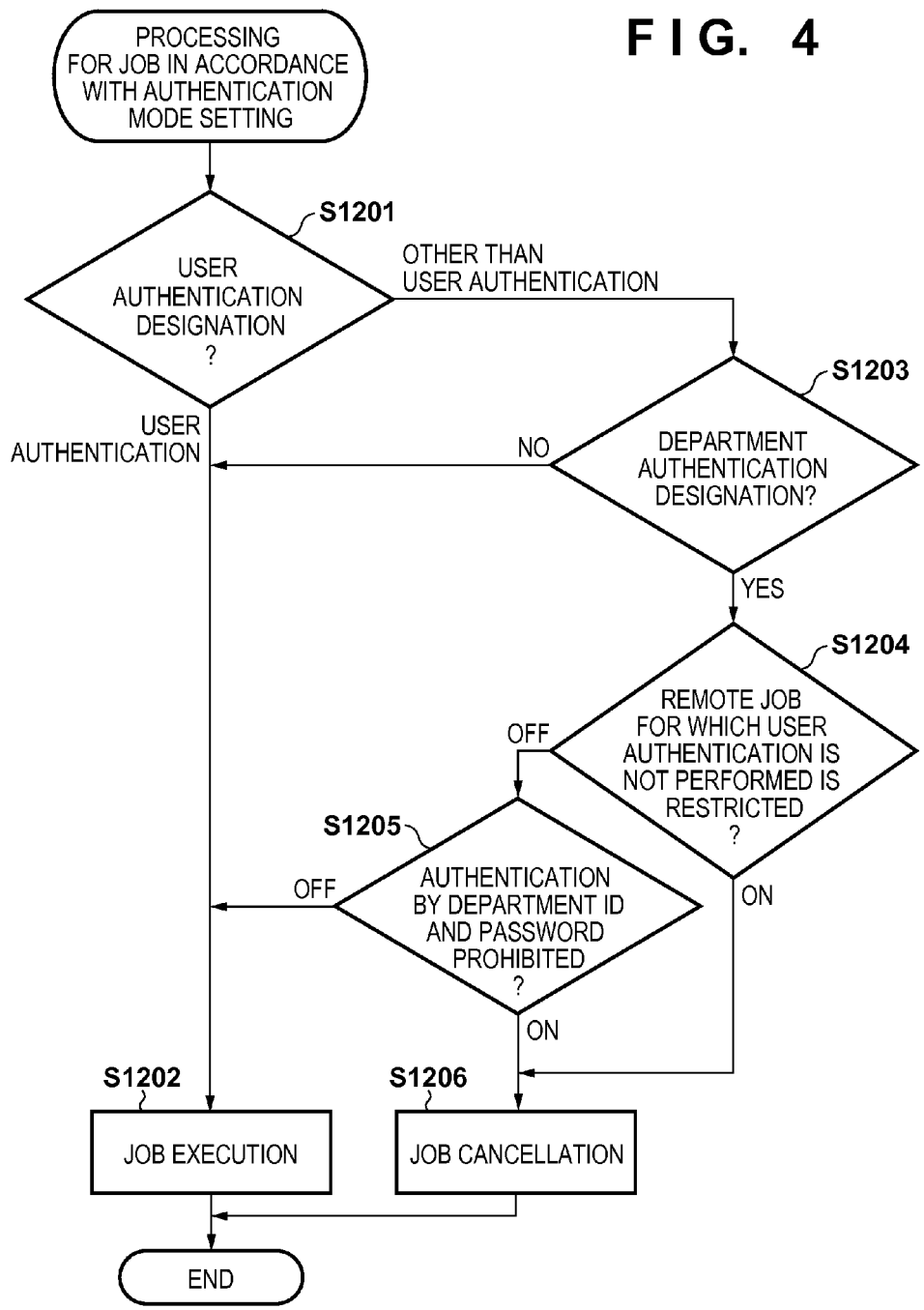
FIG. 4 is a flowchart for processing that the MFP 101 performs.

Next, for processing that the MFP 101 performs for receiving a command that the PC 102 transmits, explanation will be given using FIG. 4 which shows a flowchart for this processing. Please take note that the command that the MFP 101 receives is not limited to a command that the PC 102 generates in accordance with the flowchart of FIG. 9.

In step S1201, the control unit 203 receives a command transmitted from the PC 102 by controlling the communication unit 201, and determines whether or not the authentication mode within the received command is "user authentication". If the result of the determination is that the authentication mode is "user authentication", the processing proceeds to step S1202, and if the authentication mode is not "user authentication", the processing proceeds to step S1203.

In a case where the processing proceeds from step S1201 to step S1202, the control unit 203 executes so-called user authentication processing by determining whether or not the user name and the password within the command respectively match the user name and the password registered by the control unit 203 in advance by controlling the authentication unit 208 in step S1202. In a case where the result of user authentication processing is that the user names and passwords do match, the control unit 203 determines the user authentication to have succeeded, and executes a job attached to the command or a job transmitted from the PC 102 following the command. In a case where, by the user authentication, a job is executed, the department counter is incremented using the department ID set in advance for the authenticated user. Meanwhile, in a case where the user names and passwords do not match, the control unit 203 determines that the user authentication has failed, and notifies the PC 102 that the user authentication failed by controlling the communication unit 201.

Meanwhile, in step S1203, the control unit 203 determines whether or not the authentication mode in the command received in step S1201 is "group authentication". If the result of this determination is that the authentication mode is "group authentication", the processing proceeds to step S1204. Meanwhile, if the authentication mode is not "group authentication", the processing proceeds to step S1202 because either an authentication designation is not made by this command, or an authentication mode other than the user authentication and the group authentication is designated.

In a case where the processing proceeds from step S1203 to step S1202, the control unit 203, in step S1202, executes a job attached to the command or a job transmitted from the PC 102 following the command. Of course, in such a case, the processing details in step S1202 are not limited to this, and configuration may also be taken such that the authentication is performed in accordance with an authentication mode designated in the command, and if the authenticating succeeds, the job is executed, and if the authenticating fails, the PC 102 is notified of such.

In step S1204, the control unit 203 determines whether or not the first setting set using the GUI 600 of FIG. 6 is enabled (it is set that the user authentication is required in order to execute the job received from the PC 102). If the result of this determination is that the first setting is enabled, the processing proceeds to step S1206, and if the first setting is not enabled, the processing proceeds to step S1205.

In step S1206, the control unit 203 cancels the job as an error without executing it because execution is requested for a job for which an authentication mode, that is restricted as a setting of the MFP 101, is designated. Then the control unit 203 notifies the PC 102 that the job cannot be executed by controlling the communication unit 201.

In step S1205, the control unit 203 determines whether or not the second setting set using the GUI 500 of FIG. 5 is enabled (the group authentication is prohibited). If the result of this determination is that the second setting is enabled, the processing proceeds to step S1206, and if the second setting is not enabled, the processing proceeds to step S1202.

In a case where the processing proceeds from step S1205 to step S1202, the control unit 203 executes so-called group authentication processing by determining whether or not the authentication information for group authentication within the command matches the authentication information for group authentication registered by the control unit 203 in advance by controlling the authentication unit 208 in step S1202. In a case where the result of the group authentication processing is that the authentication information does match, the control unit 203 determines the group authentication to have succeeded, and executes a job attached to the command or a job transmitted from the PC 102 following the command. Meanwhile, in a case where the authentication information does not match, the control unit 203 determines that the group authentication has failed, and notifies the PC 102 that the group authentication failed by controlling the communication unit 201.

Next, explanation will be given using FIG. 7 for control of whether or not to execute a job by the MFP 101 corresponding to a combination of a setting using the GUIs 500 and 600 on the side of the MFP 101 and an authentication mode that a command, generated on the side of the PC 102, designates.

If the first setting set using the GUI 600 is enabled, the MFP 101, irrespective of the second setting set using the GUI 500, permits execution of the job (reception possible) in a case where the command from the PC 102 designates the user authentication, and prohibits execution of the job (reception not possible) in a case where the command from the PC 102 designates the group authentication.

If the first setting set using the GUI 600 is disabled, and the second setting set using the GUI 500 is also disabled, the MFP 101 permits the execution of the job (reception possible) regardless of whether the command from the PC 102 designates the user authentication or the group authentication.

If the first setting set using the GUI 600 is disabled and the second setting set using the GUI 500 is enabled, the MFP 101 permits execution of the job (reception possible) in a case where the command from the PC 102 designates the user authentication, and prohibits execution of the job (reception not possible) in a case where the command from the PC 102 designates the group authentication.

In this way, by virtue of the present embodiment, the MFP 101, in accordance with, the settings by the GUIs 500 and 600, is able to prevent the execution of a job for which the user authentication is not performed. For this reason, it becomes possible to cause the user authentication mode set for the MFP 101 and the authentication mode applied for the execution of a job from the PC 102 to match.

Also, it is possible for the PC 102 to select an appropriate authentication mode in accordance with the contents set using the GUIs 500 and 600 on the side of the MFP 101, to generate a command indicating this authentication mode, and transmit it to the MFP 101. Furthermore, it becomes possible to preserve compatibility with conventional driver software that only can use group authentication by setting modification in the MFP 101.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-009785, filed Jan. 22, 2014 and 2014-250318, filed Dec. 10, 2014 which are hereby incorporated by reference herein in their entirety.

What is claimed is:

1. An information processing apparatus capable of network communication with a multi-function peripheral, the apparatus comprising:

a determination unit configured to determine that the multi-function peripheral operates according to a first mode in which user authentication is available and department authentication is not available or operates according to a second mode in which both of the user authentication and department authentication are available; and a transmission unit configured to transmit, in a case that said determination unit determines that the multi-function peripheral operates according to the first mode, user authentication information to the multi-function peripheral, the user authentication information being used to causing the multi-function peripheral to perform the user authentication before performing a job, and transmit, in a case that said determination unit determines that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

2. The information processing apparatus according to claim 1, further comprising an obtaining unit configured to obtain a setting of the multi-function peripheral, wherein said determination unit is configured to determine, on the basis of the obtained setting, that the multi-function peripheral operates according to the first mode or operates according to the second mode.

3. The information processing apparatus according to claim 2, wherein the setting obtained by said obtaining unit indicates whether or not to inhibit execution of a remote job for which the user authentication has not been performed.

4. The information processing apparatus according to claim 2, wherein the setting obtained by said obtaining unit indicates whether or not to inhibit the department authentication.

5. The information processing apparatus according to claim 1, wherein the job is a print job, a remote scan job, or a FAX transmission job.

6. An information processing system having a multi-function peripheral and an information processing apparatus capable of network communication with the multi-function peripheral, the multi-function peripheral operates according to a first mode in which user authentication is available and department authentication is not available or operates according to a second mode in which both of the user authentication and department authentication are available, the information processing apparatus comprising:

a determination unit configured to determine that the multi-function peripheral operates according to the first mode or operates according to the second mode; and a transmission unit configured to transmit, in a case that said determination unit determines that the multi-function peripheral operates according to the first mode, user authentication information to the multi-function peripheral, the user authentication information being used to causing the multi-function peripheral to perform the user authentication before performing a job, and transmit, in a case that said determination unit determines that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

7. An information processing method performed by an information processing apparatus capable of network communication with a multi-function peripheral, the method comprising:

a determination step of determining that the multi-function peripheral operates according to a first mode in which user authentication is available and department authentication is not available or operates according to a second mode in which both of the user authentication and department authentication are available; and a transmission step of transmitting, in a case that it is determined in the determination step that the multi-function peripheral operates according to the first mode, user authentication information to the multi-function peripheral, the user authentication information being used to causing the multi-function peripheral to perform the user authentication before performing a job, and transmitting, in a case that it is determined in the determination step that the multi-function peripheral operates according to the second mode, authentication information to the multi-function peripheral, the authentication information being used to causing the multi-function peripheral to perform selection authentication before performing a job, the selection authentication being one selected from the user authentication and department authentication by a user.

8. A non-transitory computer-readable storage medium storing a computer program for causing a computer to function as each unit of the information processing apparatus according to claim 1.

* * * * *